3,009,713
TOWING ASSEMBLY WITH RUBBER SUSPENSION FOR TRAILERS

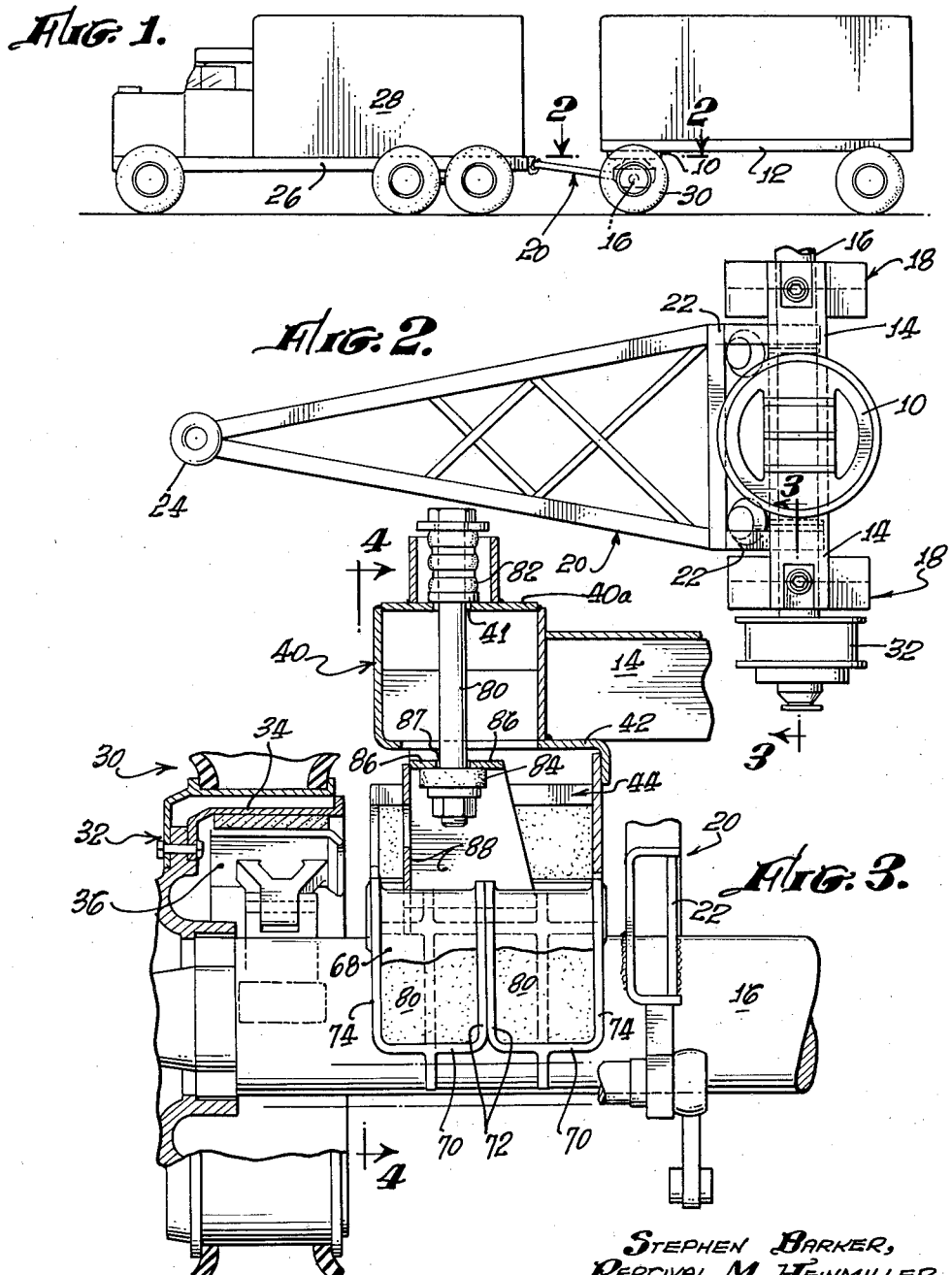

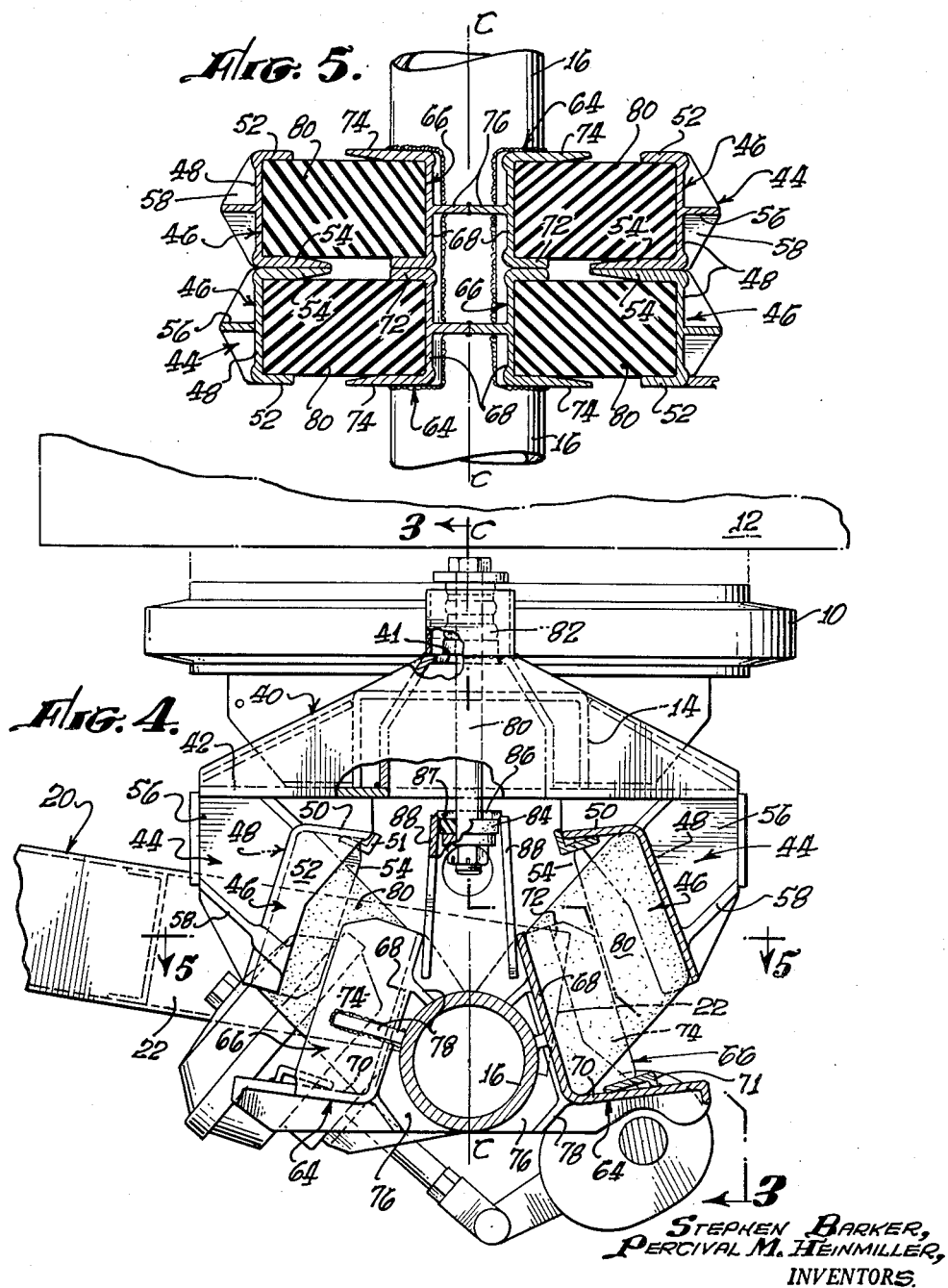

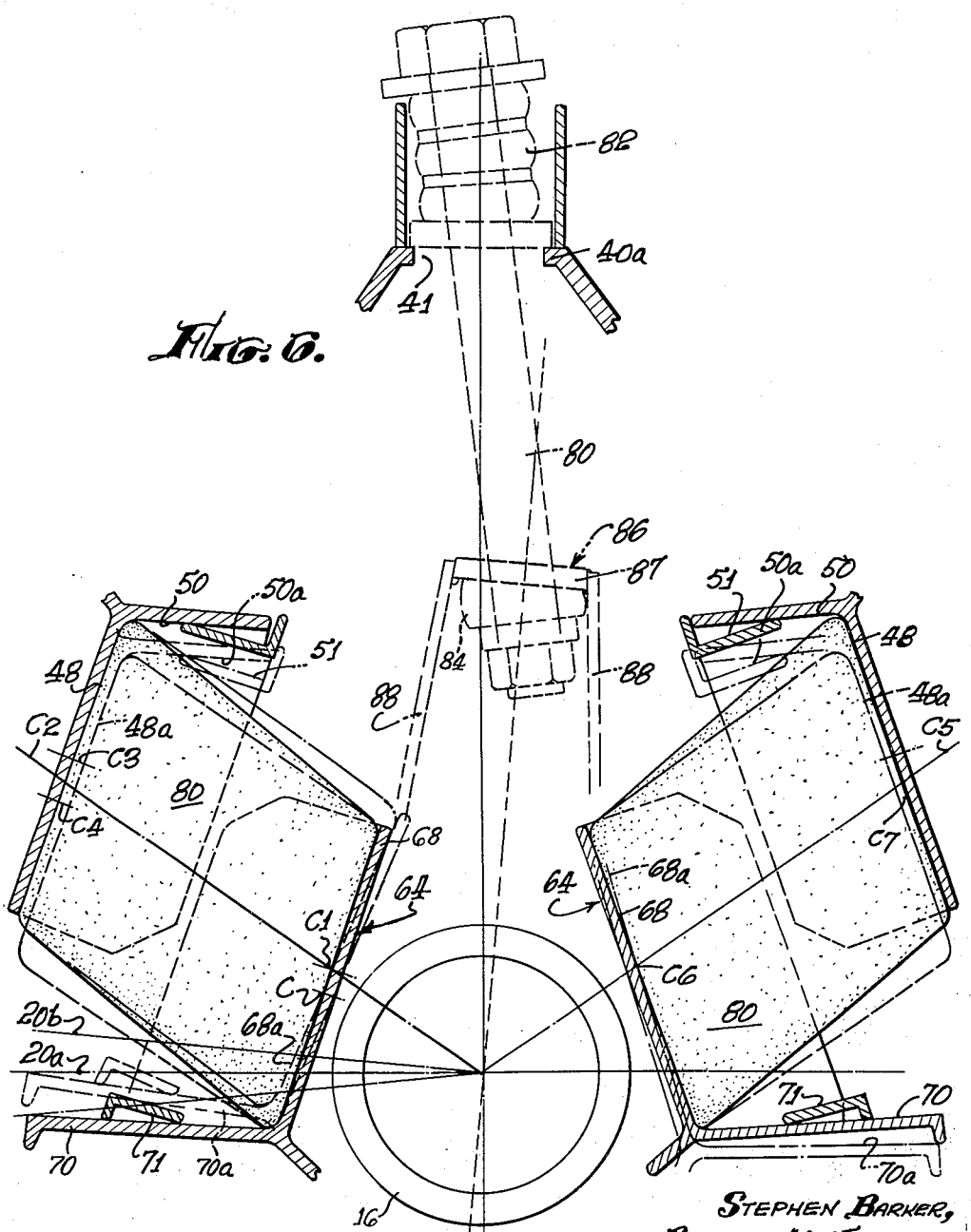

Stephen Barker, Temple City, and Percival M. Heinmiller, Pasadena, Calif., assignors to Utility Trailer Manufacturing Company, Industry, Calif., a corporation of California
Filed Jan. 18, 1960, Ser. No. 3,024
5 Claims. (Cl. 280—116)

This invention relates to improvements in the type of towing assemblies shown in Patent No. 2,872,208, issued February 3, 1959, and in the co-pending application of Percival M. Heinmiller and Irving Karsh, Ser. No. 740,695, filed June 9, 1958, now Patent No. 2,933,329, April 19, 1960.

In that type of towing assembly, which may be used as a front dirigible running gear permanently attached to the trailer or as a detachable converter dolly, brake torque is transferred to a draw bar rigidly affixed to the axle, and the axle is mounted to allow a limited and resiliently resisted angular movement of itself and the drawbar about the axle axis. In said co-pending application the load is supported on the axle by a rubber block suspension which, in itself, allows no appreciable angular axle and drawbar movement; that being provided by rubber sleeves through which the suspension is mounted on the axle.

The general object, and the improvement, of the present invention is to provide a rubber block suspension which carries the load and also, in itself, allows the desired angular movement of the axle and drawbar yieldingly opposed by a resilient torque of suitably small amount. And the same rubber suspension that carries the load and allows yielding angular movement, also yieldingly takes and transmits the longitudinal traction and braking thrusts. How these, and other features of the invention, are accomplished, will be understood from the following description of a typical and illustrative form of the invention, with reference to the accompanying drawings, in which:

FIG. 1 is a general elevation showing a towing vehicle and trailer equipped with the towing assembly;

FIG. 2 is an enlarged plan of parts of the towing assembly taken as indicated by line 2—2 on FIG. 1;

FIG. 3 is a further enlarged fragmentary vertical section taken as indicated by lines 3—3 on FIGS. 2 and 4;

FIG. 4 is an elevation on line 4—4 of FIG. 3;

FIG. 5 is a horizontal section on line 5—5 of FIG. 4; and

FIG. 6 is a schematic in the aspect of FIG. 4 illustrating certain features of the invention.

The present towing assembly may be used either as a detachable converter dolly or as a permanent dirigible front running gear, and is here shown, for simplicity, in the latter form. In that form, a member such as shown at 10 forms the lower part of a fifth wheel assembly mounted under the forward part of a trailer frame 12. The fifth wheel member 10 is mounted centrally on a transverse beam 14, that beam being supported at each end on axle 16 by a suspension assembly generally designated 18 in FIG. 2. Drawbar frame 20 has two laterally spaced members 22 rigidly attached to axle 16, as by welding, and has a forward end 24 adapted to be hitched to the frame 26 of a towing vehicle 28. The dead axle 16 carries at each end a tire, or tires 30 mounted on suitable bearing supported wheel, or wheels 32. The wheel hubs carry brake drums 34 and brake shoes 36 are mounted on axle 16. Braking torque is thus transferred to the axle and through it to the drawbar, being resisted by connection of the drawbar to the towing vehicle.

Since the suspension structures 18 at opposite ends of beam 14 and axle 16 are duplicates, only one is shown in detail in FIGS. 3 and following. The following descriptions apply to both those suspensions.

As shown in FIGS. 3 and 4, a structure 40 with a bottom plate 42 is mounted on the end of beam 14, the structure in its lower part, and plate 42, extending fore and aft of the beam. Under that structure, and rigidly attached to its plate 42 is an inverted V-formation made up of two elements 44 spaced fore and aft symmetrically with relation to the vertical transverse plane central of beam 14 and axle 16; that plane indicated by line C—C on FIGS. 4 and 5. As shown in those figures, each element 44 is made up of two essentially duplicate parts 46 each having an outer seat web 48 which slopes downwardly and outwardly from central plane C—C at an angle with the vertical of about 20°. Each part 46 also has an upper seat flange 50 which slopes downwardly and inwardly toward plane C—C at a slight angle to the horizontal. And each of those parts 46 also has lateral flanges 52 and 54 extending down from upper seat 50 along the lateral edges of seat web 48. As shown best in FIG. 5, flanges 54 which lie against each other, are relatively wide; while flanges 52 which are at the outer and inner sides of the composite elements 44, are relatively narrow. In the elements 44, the flanged seats are reinforced and rigidly connected to plate 42 of the upper structure 40 by the webs and flanges shown at 56 and 58.

An opposing V-formation is made up of two composite elements 64 rigidly mounted on axle 16 and spaced symmetrically fore and aft of plane C—C. Each element 64 is made up of the two essentially duplicate parts 66 each having an inner seat web 68 that is normally substantially parallel to the opposing seat web 48. Each part 66 also has a lower seat flange 70 substantially normally parallel to the opposing upper seat flange 50. Each part 66 also has lateral flanges 72 and 74 extending up from lower seat flange 70 along the lateral edges of seat web 68. As shown in FIG. 5, flanges 74, relatively wide, are at the outer and inner sides of the composite elements 64; and the relatively narrow flanges 72 lie against each other. The flanged seats of each part 66 are reinforced and rigidly connected, as by welding, to axle 16 by webs and flanges such as shown at 76 and 78.

Rubber blocks 80, rhomboidal in form in the aspect of FIG. 4, are confined between the opposing seats 48 and 68 and upper and lower seats 50 and 70. FIG. 4 shows the upper V-formation 44 in its uppermost position relative to the lower formation 64; that is, in the relative position when the suspension is carrying no load other than the weight of the unloaded trailer—the condition here spoken of as "no load." A hold-down bolt 80 with a head bearing down on a cushioning sleeve 82 seated on structure 40 and with a nut and washer bearing up on a rubber washer 84, limits upward movement on rebound of the upper structure. The washer 84 bears up against a web 86 that forms an integral part of a yoke member 88 whose lower end is attached, as by welding, to the two elements 64 of the lower V-formation. Under load, the upper V-formation moves down, and bolt 80 slides down through 86. Further particular functioning of the hold-down bolts is described later in connection with FIG. 6.

Side sway of the trailer body and the upper V-formations relative to the lower ones and the axle, is resiliently opposed by lateral compression of the rubber blocks between the opposed wide flanges 54 and 74 of the two V-formations. Preferably, the rubber blocks are not bonded to the seats 48, 68 or to the side flanges, so as to allow the desirable creeping action on the seats, under load depression and rebound, that is described in the co-pending application of Heinmiller and Karsh, Ser. No. 724,967, filed March 31, 1958; reference to which is made for description of that action.

Reference is now had to the schematic showing in FIG. 6. In this figure, the normal "no load" position of the upper V-formation, with its backing seats 48 and upper seats 50, is shown in full lines; and the normal "no load" configuration of the rubber blocks 80 is shown in heavy solid lines. The drawing FIGURES 3, 4 and 5 are all closely to the same scale, FIG. 6 being also closely to scale; and the dimensions of the particular illustrative suspension discussed here may be ascertained from the drawings by taking the diameter of axle 16 to be 5 inches. The rubber blocks 80 in that suspension were of 70 Duro. The smaller angle of their rhomboidal pattern was about 70° under normal "no load" condition. And their rhomboidal dimensions measured, normal to the faces, between their upper and lower faces, and between their lateral faces, were approximately equal. As so measured, their thickness, from right to left in FIGS. 4 and 6, is approximately equal to their height, both about five and one-eighth inches.

Under a load of 8000 lbs.—4000 on each suspension—the depression of the upper V-formation was approximately five-eighths of an inch. Under that depression, the positions of backing seats 48 and upper seats 50 are indicated by the broken lines at 48a and 50a. And the outlines of the rubber blocks are shown in heavy broken lines. In that depressed position backing seats 48a have moved normally toward the backing seats 68 of the lower V-formation a distance—seven thirty-seconds of an inch in this case—which is a very small fraction of the normal distance between those two seats. Thus, under a median load for the suspension size discussed, the rubber blocks are compressed laterally very little. A major portion of the load is taken by the rubber in vertical shear.

As previously stated, the suspension described here acts, in itself, to apply a limited yielding torque resistance to the axle and its integrated drawbar. In spite of the fact that the particular suspension discussed here is capable of carrying loads up to sixteen or seventeen thousand pounds on the axle, its torque resistance to required angular movements of the drawbar is relatively small, for reasons that will appear.

With the suspension substantially in the typical normal relative positions of its parts previously described and shown in FIG. 6, draw-bar 20 is supported in a position extending horizontally forward of the axle, or inclining slightly upwardly. For simplicity here, a horizontal mean and normal position is assumed; represented in FIG. 6 by the line 20a. A draw-bar length of about 78 inches is typical. Lift of the forward draw-bar end 24 of about 7 inches above the mean position, and a depression of about the same amount below mean, is desirable for hitching the draw-bar to different towing vehicles, and to allow for road-way variations. In the particular instance here discussed, a lifting force of only 200 pounds was required to lift the draw-bar end 7 inches under "no load," or 5½ inches under 8000 pounds load; and a force of 180 pounds to depress the drawbar 6 inches under no load, or 4½ inches under 8000 pounds load. The reasons for those relatively small required forces will appear from further consideration of FIG. 6.

The broken line 20b indicates draw-bar position with its front end raised seven inches. The upward swing about the axis of the axle is about five degrees. That upward swing throws the two seats 68 to the positions shown in broken lines at 68a and the lower seats 70 to the positions 70a. Now, consider seat 68 at the left in FIG. 6. Its center, and the center of that face of block 80 is indicated at C for normal position, and at C1 for its angularly displaced position at 68a. From the diagram it will be noted that the upper half of face 68 has moved away from the opposing face 48 in either of the latter's positions; while only the lower half of face 68 has moved toward 48. Lateral compression of the upper half of the rubber block is thus relieved while the lower half only is compressed. That fact is due primarily to the positional relations of seats 48 and 68 to each other and to the axis of axle 16. Seat 68 is located very close to the axle, approximately at the outer axle surface. In this particular instance its center C is only about 3 inches from the axis of an axle of 2½ inches radius. A line radial of the axle through C in normal position makes an angle of less than 30° with the horizontal, and that center C is normally only about one and three-eighths inches above the axle axis. Furthermore, the radial line shown at C2 through the angularly displaced seat center C1 passes very close to, in fact between, the normal center C3 of seat 48 and its loaded center C4. All these features of the design, plus the fact that the rubber is only slightly compressed, between seats 48 and 68, under load, make for the relatively low torque resistance of the suspension capable of carrying up to sixteen or seventeen thousand pound loads.

Without the necessity of going into detail about the seats and block shown at the right in FIG. 6, it will be immediately noted from the figure that only the upper half of 68, in its angularly swung position 68a, approaches 48, while the lower half recedes; and the radial line C5 through the normal seat center C6 passes through the load displaced seat 48a not very far from its center C7.

On depression of the draw-bar, the relative movements of the two seats 68 are simply the reversal of what has been above discussed, and the torque resisting actions are the same.

Relative vertical angular movement of the drawbar and the described angular movements of the inner V-formation 64, is usually necessary to hook the drawbar up with a towing vehicle, and takes place, up and down, more or less constantly during road travel. The auxiliary seat members 51 and 71, on seat flanges 50 and 70, keep the rubber blocks 80 from rotating in the plane of FIG. 4 and slipping out of position during the up and down movement of the drawbar. And the hold-down bolts 80 freely allow the described angular movements while at all times limiting the relative upward movement of the outer V-formation 44.

As shown in FIGS. 3, 4 and 6, the cushioning element 82 at the upper end of hold-down bolt 80 rests on member 40a of structure 40, that member 40a having a bolt passing slot 41 which is elongate in the plane of FIGS. 4 and 6. The member 86 through which the lower end of the bolt passes, and against which the cushioning element 84 bears upwardly, has also the bolt passing slot 87, elongate in the same plane. In fact, member 86 is made up of two spaced members, as shown in FIG. 3, forming the slot 87 between them. Thus, the hold-down bolt, in addition to allowing load depression on the outer V-formation and the trailer frame, also freely allows the described relative angular movements of the inner V-formation. FIG. 6 shows, for example, the position taken by bolt 80 on the described upward swing of the drawbar with the suspension under no load. The slot formations 41 and 87 allow the bolt to swing to such a position as shown, with its heads or cushioning elements still engaging, or engageable with, slotted members 40a and 86 to limit upward movement. And under load the bolt, then merely hanging from 40a, and free to move at its two ends longitudinally of the slots to accommodate its angular position, may then move its lower end down within the stirrup 88 to accommodate depressions under all loads. And at the same time its lower end is always in position to limit rebound by coming up against 86. All the necessary freedoms are provided for in an extremely simple hold-down structure.

While the suspension thus fully accommodates the described angular movements under all loads, it also acts to directly absorbingly transmit the longitudinal traction and braking thrusts applied to the axle in road travel. As stated previously, the seats 68 of the inner, axle-mounted, V-formation are located not only substantially at the axle exterior, but their centers C are located close to the horizontal plane of the axle axis. Consequently those horizontal thrusts are directly imposed by seats 68 on the rubber blocks substantially at axle level with only small components of the thrust forces reacting on the inner V-formation in directions tending to rotate it about the axle axis.

We claim:

1. A towing assembly for vehicles, comprising in combination a dead axle member carrying road wheels, a draw-bar substantially rigidly attached to the axle member, structure adapted to support a vehicle body on the axle member, said supporting structure comprising members in V-formation substantially rigidly carried by the axle member, body supporting members in V-formation opposing the first mentioned V-formation members, blocks of rubber-like material located between the opposing V-formation members, said V-formations being located in a vertical plane transverse of the axle, and hold-down means extending between the two V-formations, allowing depression of the second mentioned with relation to the first mentioned V-formation, and allowing relative rotation of the first mentioned V-formation in said plane to accommodate vertical angular movement of the drawbar and axle member about the axis of the axle member; said hold-down means comprising a normally vertical hold-down bolt with upper and lower heads, slotted members rigidly associated with each of the V-formations, the slots in said members being elongate in said plane of the V-formation, said bolt extending through said slots with its heads respectively above and below the two slotted members.

2. The combination defined in claim 1 and in which the members of the axle-carried V-formation are located substantially against the axle member and substantially at the axle level, and in which the rubber-like blocks are rhomboidal in form in the plane of the V-formations and of approximately equal dimensions measured normally between their opposite faces.

3. A towing assembly for vehicles, comprising in combination a dead axle member carrying road wheels, a drawbar substantially rigidly attached to the axle member, structure adapted to support a vehicle body on the axle member, said supporting structure comprising members in V-formation substantially rigidly carried by the axle member, body supporting members in V-formation opposing the first mentioned V-formation members, blocks of rubber-like material located between the opposing V-formation members, said V-formations being located in a vertical plane transverse of the axle, and hold-down means extending between the two V-formations, allowing depression of the second mentioned with relation to the first mentioned V-formation, and allowing relative rotation of the first mentioned V-formation in said plane to accommodate vertical angular movement of the drawbar and axle member about the axis of the axle member; the members of the axle carried V-formation being rigidly attached thereto and located substantially against the axle member and substantially at the axle level, and the rubber-like blocks being of approximately equal dimensions measured normally between their opposite faces, all so that the rubber-like blocks not only take the load but also allow resiliently opposed vertical displacement of the drawbar and accompanying swinging of the axle-mounted V-formation about the axle axis.

4. A towing assembly for vehicles, comprising in combination a dead axle member carrying road wheels, a draw-bar substantially rigidly attached to the axle member, structure adapted to resiliently support a vehicle body on the axle member and to resiliently allow angular displacement of the draw-bar about the axis of the axle in a vertical plane, said structure comprising seat-forming members in V-formation at opposite sides of the axle and substantially rigidly attached to the axle, body supporting seat-forming members in V-formation spacedly opposing the axle-carried members, blocks of rubber-like material located between and seated on the opposing V-formation members, said V-formation members being located in a vertical plane transverse of the axle, the rubber-like blocks being so located with respect to the axle that lines radial of the axle axis and passing through the centers of their seats on the V-formation members make an angle with the horizontal of not more than approximately thirty degrees, and hold-down means extending between the two V-formations, allowing depression of the second mentioned with relation to the first mentioned V-formation, and freely allowing relative rotation of the first mentioned V-formation in said plane to accommodate vertical angular movement of the drawbar and axle member about the axis of the axle member.

5. The combination defined in claim 4, and in which the hold-down means comprises a normally vertically extending member, and connections between said member and each of the V-formations allowing relative swinging of said member in said vertical plane.

References Cited in the file of this patent

UNITED STATES PATENTS

| | | |
|---|---|---|
| 2,263,599 | Tucker | Nov. 25, 1941 |
| 2,933,329 | Heinmiller et al. | Apr. 19, 1960 |